(12) United States Patent
Fukuyoshi et al.

(10) Patent No.: US 6,249,082 B1
(45) Date of Patent: Jun. 19, 2001

(54) ELECTRODE PLATE HAVING TRANSPARENT TYPE OR REFLECTIVE TYPE MULTI-LAYERED CONDUCTIVE FILM AND METHOD FOR MANUFACTURING THE SAME

(75) Inventors: Kenzo Fukuyoshi; Yukihiro Kimura; Koji Imayoshi, all of Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 09/228,644

(22) Filed: Jan. 12, 1999

(30) Foreign Application Priority Data

Jan. 13, 1998 (JP) .................................................. 10-004720

(51) Int. Cl.[7] .......................... G02F 1/1343; H01J 31/00; H01B 1/16
(52) U.S. Cl. .......................... 313/479; 313/461; 428/403; 428/389
(58) Field of Search .................................. 313/491, 574, 313/503, 631, 461, 466, 473, 479; 428/1, 403, 472, 702, 384, 389; 349/139

(56) References Cited

U.S. PATENT DOCUMENTS 5,189,337 * 2/1993 Endo et al. ........................ 313/479
5,667,853 * 9/1997 Fukuyoshi et al. ...................... 428/1

* cited by examiner

*Primary Examiner*—Ashok Patel
(74) *Attorney, Agent, or Firm*—Staas & Halsey LLP (57) ABSTRACT

An electrode plate for display device includes a substrate and a multi-layered conductive film. The multi-layered conductive film includes a lower side amorphous oxide layer, a silver-based layer, and an upper side amorphous oxide layer. The lower side amorphous oxide layer and the upper side amorphous oxide layer are formed of an amorphous and amorphous-like material. The film thickness of the upper side amorphous oxide layer is not larger than 20 nm.

17 Claims, 2 Drawing Sheets

ELECTRODE PLATE HAVING TRANSPARENT TYPE OR REFLECTIVE TYPE MULTI-LAYERED CONDUCTIVE FILM AND METHOD FOR MANUFACTURING THE SAME

BACKGROUND OF THE INVENTION

This invention relates to an electrode plate which has a substrate and a multi-layered conductive film and which can be applied to a reflection preventing film, electromagnetic wave shielding film, transparent type or reflective type electrode for solar battery or electrode plate for a display device such as a liquid crystal display device or EL (electroluminescence) display device and a method for manufacturing the electrode plate.

A transparent electrode formed by arranging a transparent conductive film for permitting light of predetermined electrode pattern to pass therethrough on a glass substrate, plastic substrate or substrate on which semiconductor elements are formed is widely used for display electrodes of various types of display devices such as a liquid crystal display, an input/output electrode which permits an input to be directly effected on the display screen of the display device and the like.

As a liquid crystal display device using the transparent electrode, it is generally to use a transmission type liquid crystal display device containing a light source (lamp) as a back light. In the transmission type liquid crystal display device, since the power consumption by the back light lamp is large and thus the service life is short in the case of battery driving, the portability which the liquid crystal display device originally has cannot be fully utilized. For this reason, at present, a reflective type liquid crystal display device using ambient light (that is, containing no back light lamp) is actively developed.

Figure 5:
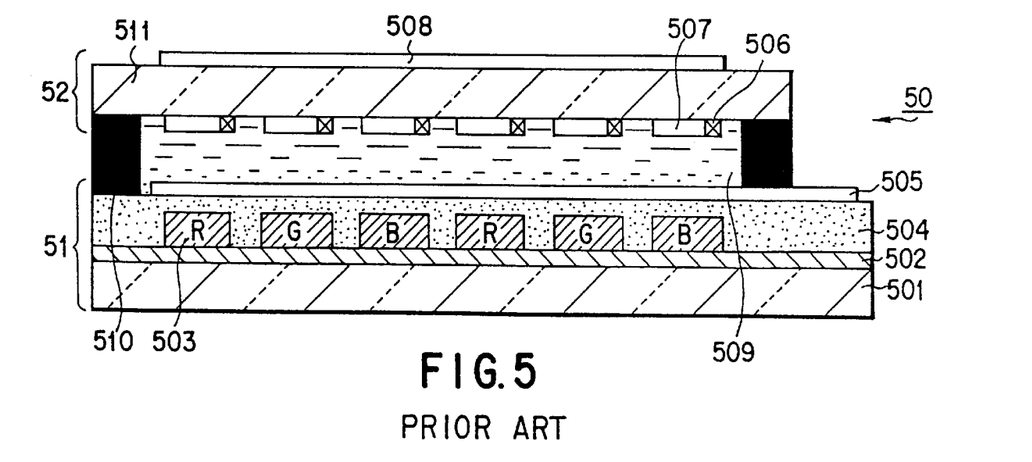
FIG. 5 is a view showing the schematic structure of a conventional reflective type liquid crystal display device.

FIG. 5 shows a reflective type liquid crystal display device 50 which is formed of a reflective type electrode plate 51 and a transparent electrode plate 52 with sandwiching LCD 509. The reflective electrode plate 51 is adhered to the transparent electrode plate 52 via a seal 510 such that the transparent electrode 507 faces the transparent electrode 505.

In the reflective electrode plate 51, a reflection film 502 and color filter 503 are sequentially formed on the surface of a back substrate 501 comprised of, for example, glass which faces a liquid crystal 509. A protection layer 504 for protecting and the leveling the surface of the color filter 503 and a transparent electrode 505 are sequentially formed on the color filter 503.

On one surface of the transparent plate, such as a glass plate 511, a polarizing film 508 is laminated. On the other surface of the glass plate 511, an array of transparent electrode 507 with TFT (thin film transistor)s 506 is formed. The color filter 503 is formed of plural pixels of light transmission type (which are hereinafter simply referred to as pixels) colored in R (red), G (green) and B (blue) and arranged in a predetermined pattern. The reflection film 502 is also used as a reflection electrode which can be used as a liquid crystal driving electrode in some cases.

In the conventional case, a thin aluminum film is widely used as the reflection film 502 formed on the back substrate 501. This is because aluminum is a metal having a large reflectance of light in the visible region, but recently, it is proposed to use silver as a material of the reflection film from the viewpoint of enhancement of the reflectance and a problem that a lowering in the reflectance of aluminum due to contact with the liquid crystal or glass substrate occurs.

However, the reflectance of silver itself is larger than aluminum by approx. 10%, but it has the following main defects when it is used to form a thin film of the electrode plate.

First, the adhearability thereof to the substrate of a material such as glass or plastic is low and it is easily separated from the substrate when it is formed on the substrate as a thin silver film. Particularly, when an electrode is formed on the substrate such as a glass plate, an $SiO_2$ film is previously formed on the substrate and a silver-based layer is formed on the $SiO_2$ film in some cases in order to prevent nebula of silver (or prevent the silver-based layer from becoming slightly opaque) due to migration of alkali metal from the substrate. At this time, since the adhesion between the $SiO_2$ film and the silver-series thin film is poor, it is necessary to form an adhesion layer formed of a thin oxide film between the $SiO_2$ film and the silver-series thin film. Therefore, the manufacturing process becomes complicated and the manufacturing cost is increased.

Secondly, a silver-series thin film formed of highly pure silver on the substrate tends to aggregate and become opaque by the influence of heat and oxygen and the reflectance of light tends to be lowered.

Thirdly, in a case where the thin silver film is exposed and made in direct contact with the outside air, silver sulfide or silver oxide is formed on the surface of the thin silver film and the thin silver film becomes discolored and the reflectance thereof is lowered.

Therefore, as the technique for solving the above problem and defects, the technique for forming a three-layered conductive film having a thin silver film disposed between oxide layers is proposed in U.S. Pat. No. 5,667,853 by the inventors of this invention.

In the above proposal, in a case where the transparent electrode for the transmission type liquid crystal display device is formed by use of the three-layered conductive film, the upper side oxide layer (oxide layer formed on the upper surface of the thin silver film) is formed in an amorphous state and the upper and lower oxide layers are formed with a slightly large film thickness of approx. 40 nm in order to attain the optimum optical characteristic. The reason why the upper side oxide layer is formed in the amorphous state is to prevent that silver atoms move along the grain boundary when crystals or grains are present in the oxide layer and the silver-based layer is aggregated or becomes opaque and the reflectance or transmissivity is lowered.

However, the above proposal has the following problem.

When the three-layered conductive film of the above proposal is patterned by the photolithography process by use of an etching solution, contact corrosion due to contact between different types of metals occurs, damage due to the etching process (particularly, damage to the interface between the thin silver film and the oxide film) is large, and particularly, the upper side oxide layer may be easily separated.

Further, in order to form a stable amorphous film as the oxide film, a mixed oxide layer having different types of oxide materials mixed together is used in some cases. But in this case, the electrical connection resistance of the conductive film becomes high and it is not desirable as the conductive film. Further, as described before, since damage to the interface between the thin silver film and the oxide film occurs, the reliability such as humidity resistance is greatly lowered and it does not reach the practical level.

BRIEF SUMMARY OF THE INVENTION

This invention is made to solve the above problem and an object of this invention is to provide an electrode plate including a transmission type or reflective type conductive film and having an excellent optical characteristic (transmittance, reflectance), low electrical connection resistance, good patterning configuration and high reliability.

In the following description, the lower side amorphous or amorphous-like oxide layer is an oxide layer which is one of the oxide layers holding the silver-based layer therebetween and is formed on the substrate before formation of the silver-based layer and the upper side amorphous or amorphous-like oxide layer and upper side oxide layer are oxide layers laminated on the silver-based layer after formation of the silver-based layer.

(1) According to this invention, there is provided an electrode plate for display device which includes a substrate and a multi-layered conductive film, the multi-layered conductive film including a silver-based layer, a lower side amorphous oxide layer formed of an amorphous or amorphous-like material for suppressing the movements of silver atoms at the interface with the silver-based layer, and an upper side amorphous oxide layer formed of an amorphous or amorphous-like material for suppressing the movements of silver atoms at the interface with the silver-based layer, the film thickness of at least the upper side amorphous oxide layer being not larger than 20 nm.

With the above configuration, the upper side amorphous oxide layer has a function for suppressing the movements of silver atoms at the interface with the silver-based layer (it practically plays a role as an anchor for fixing the movements of silver atoms) and can suppress occurrence of aggregation and slight opaqueness caused by the movements of silver atoms at high temperatures and a lowering in the transmissivity or reflectance due to the aggregation and slight opaqueness.

It is preferable that the upper side amorphous oxide layer is an oxide layer in which the value of an optical film thickness defined as the product of the film thickness and the refractive index is 20 nm or less.

With the above configuration, the refractive index of the upper side amorphous oxide layer can be set to a smaller value and the reflectance can be enhanced when the electrode plate is formed as the reflective type.

The electrode plate for display device has a protection layer formed on the upper side amorphous oxide layer and it is preferable that the sum of the optical film thicknesses of the upper side amorphous oxide layer and the protection layer is 70 nm or more. With the above configuration, the transmissivitys of the upper side amorphous oxide layer and the protection layer can be enhanced when the electrode plate is formed as the transmission type.

The electrode plate for display device has a protection layer formed on the upper side amorphous oxide layer. It is preferable that the protection layer is formed of an oxide layer having the refractive index equal to or smaller than that of the upper side amorphous oxide layer and it is preferable that the lower side amorphous oxide layer has an underlaid layer formed of an oxide layer having the refractive index equal to or smaller than that of the lower side amorphous oxide layer.

With the above configuration, the refractive indexes of the upper side amorphous oxide layer and the lower side amorphous oxide layer can be enhanced. As a result, the transmissivity can be further enhanced when the electrode plate for display device is formed as the transmission type.

It is preferable that the lower side amorphous oxide layer of the electrode plate for display device is a mixed oxide which contains cerium oxide as a main material and additionally contains one or more oxide materials selected from a group of ytrium oxide, zirconium oxide, niobium oxide, hafnium oxide, tantalum oxide and tungsten oxide.

With the above configuration, the lower side amorphous oxide layer has high adhesion with the silver-based layer and has an alkali barrier effect for preventing migration of alkali metal such as Na from the substrate which is a supporting member into the silver-series thin film.

The electrode plate for display device is characterized in that at least niobium oxide is used as the mixed oxide mixed with the cerium oxide which is the main material of the lower side amorphous oxide layer. It is characterized in that the lower side amorphous oxide layer is formed of an amorphous or amorphous-like mixed oxide which contains at least niobium oxide mixed with cerium oxide.

With the above configuration, the lower side amorphous oxide layer sufficiently prevents migrations of alkali metal such as Na from the substrate into the silver-based layer and of silver atoms to the interface of silver-series thin film. As a result, the reliability can be enhanced.

In the electrode plate for display device, the silver-based layer may be a silver alloy containing at least one metal selected from a group of platinum, palladium, gold, copper and nickel added to silver by 3 at % (atomic percentage) or less.

A conventional multi-layered film is added to silver by larger than 3 at % (atomic percentage). However, with the above configuration, since the silver-based layer is held between the upper side amorphous oxide layer and the lower side amorphous oxide layer, the substrate can be stably carried in the manufacturing process such as the photolithography process and a protection layer can be formed after formation of the pattern. As a result, an additive amount of an alloy element added to silver can be suppressed to minimum and the performance of the conductive film can be further enhanced.

(2) According to this invention, there is provided an electrode plate for display device which includes a substrate and a multi-layered conductive film, the multi-layered conductive film including a lower side amorphous oxide layer formed of an amorphous or amorphous-like material for suppressing the movements of silver atoms at the interface with the silver-based layer, a silver-based layer, and an upper side oxide layer, the upper side oxide layer including an oxide layer and an amorphous oxide layer formed of an amorphous or amorphous-like material for suppressing the movements of silver atoms at the interface with the silver-based layer and the film thickness of the upper side amorphous oxide layer being not larger than 20 nm.

With the above configuration, the upper side oxide layer and the lower side amorphous oxide layer have a function for suppressing the movement of silver atoms at the interface with the silver-based layer (it practically plays a role as an anchor for fixing the movements of silver atoms) and can suppress occurrence of aggregation and slight opaqueness caused by the movements of silver atoms at high temperatures and a lowering in the transmissivity or reflectance due to the aggregation and slight opaqueness.

It is preferable that the value of an optical film thickness defined as a product of the film thickness and a refractive index of the amorphous oxide layer included in the upper side oxide layer is not larger than 20 nm or less.

With the above configuration, the refractive index of the amorphous oxide layer can be lowered and the reflectance can be enhanced when the electrode plate is formed as the reflective type.

It is preferable that the electrode plate for display device has a protection layer formed on the upper side oxide layer and the sum of the optical film thicknesses of the upper side oxide layer and the protection layer is 70 nm or more.

With the above configuration, the transmissivitys of the upper side oxide layer and the protection layer can be enhanced when the electrode plate is formed as the transmission type.

The electrode plate for display device has a protection layer formed on the upper side oxide layer and it is preferable that the protection layer is an oxide layer having the refractive index equal to or smaller than that of the amorphous oxide layer and it is preferable that the lower side amorphous oxide layer has an underlaid layer formed of an oxide layer having the refractive index equal to or smaller than that of the lower amorphous oxide layer.

With the above configuration, the refractive indexes of the amorphous oxide layer and the lower side amorphous oxide layer can be enhanced, and as a result, the transmissivity can be further enhanced when the electrode plate for display device is formed as the transmission type.

It is preferable that the lower side amorphous oxide layer of the electrode plate for display device is formed of a mixed oxide which contains cerium oxide as a main material and additionally contains one or more oxide materials selected from a group of ytrium oxide, zirconium oxide, niobium oxide, hafnium oxide, tantalum oxide and tungsten oxide.

With the above configuration, the lower side oxide layer has high adhesion with the silver-series thin film and has an alkali barrier effect for preventing migration of an alkali metal such as Na from the substrate which is a supporting member into the silver-series thin film.

The electrode plate for display device is characterized in that at least niobium oxide is used as the mixed oxide added to the cerium oxide which is the main material of the lower side amorphous oxide layer. It is characterized in that the lower side amorphous oxide layer is formed of an amorphous or amorphous-like mixed oxide which contains at least niobium oxide mixed with cerium oxide.

With the above configuration, the lower side oxide layer sufficiently prevents migration of alkali metal such as Na from the substrate and of silver to the interface of silver-series thin film. As a result, the reliability can be enhanced.

The electrode plate for display device is characterized in that the silver-based layer may be formed of a silver alloy containing at least one metal selected from a group of platinum, palladium, gold, copper and nickel added to silver by 3 at % (atomic percentage) or less.

A conventional multi-layered conductive film has more than 3 at % materials added to silver to stabilize the movement of silver. However with the above configuration, since the silver-based layer is held between the lower side amorphous oxide layer and the upper side amorphous oxide layer, the substrate is not affected by the manufacturing process such as the photolithography process and thus a protection layer can be formed after formation of the pattern. As a result, an additive amount of an alloy element added to silver can be suppressed to minimum and the performance of the conductive film can be further enhanced.

(3) According to this invention, there is provided a method for manufacturing an electrode plate for display device comprising the following steps of forming a multi-layered conductive film on a substrate, the multi-layered conductive film comprising a lower side amorphous oxide formed of amorphous or an amorphous-like oxide, an upper side amorphous oxide formed of an amorphous or amorphous-like oxide and a silver-based layer which held between the lower side amorphous oxide layer and the upper side amorphous oxide layer, a film thickness of the upper side amorphous oxide layer being not larger than 20 nm; forming an electrode by patterning the oxide layers together with the silver-based layer and forming a protection layer on the electrode, a film thickness of the protection layer being adjusted to attain an optimum optical characteristic as the electrode.

According to this invention, there is provided a method for manufacturing an electrode plate for display device comprising the following steps forming a lower amorphous oxide layer formed of an amorphous or amorphous-like material forming a silver-based layer on the lower amorphous oxide layer and forming an upper amorphous oxide layer formed of an amorphous or amorphous-like material and having a film thickness not larger than 20 nm on the silver-based layer.

With the above configuration, since the photolithography process can be effected when the conductive film is formed in a predetermined electrode pattern, the etching process can be easily effected, no damage to the interface portion between the amorphous oxide layer and the silver-based layer due to the etching process occurs and the patterning process can be effected with high precision.

In the method for manufacturing the electrode plate for display device, it is preferable that the step of forming the protection layer is a step of forming the protection layer made of an electrical insulating material on the electrode with a sufficiently large film thickness for protection in a portion other than the electrical connection portion of the electrode.

With the above configuration, since the protection layer has an electrically insulating property, the electrical short circuit between the facing substrates can be prevented. Therefore, the abnormal operation due to the electrical short circuit can be prevented.

In the method for manufacturing the electrode plate for display device, it is preferable that the pattern processing step of effecting the patterning process is a photolithography method using a photoresist, the resist in the electrode portion for electrical connection is left behind when the photoresist is selectively removed after the electrode pattern is formed in the process of the photolithography method, and the resist left behind is used as a mask for forming the protection layer, then the resist is removed to expose the electrode portion for electrical connection from the protection layer. Further, it is preferable that the pattern processing step of effecting the patterning process is a mask sputtering method.

With the above configuration, if the photolithography method using the photoresist is used as the method for selectively forming the protection layer on the electrode plate, selection with the high precision can be attained and a manufacturing method suitable for a highly precise pattern of a liquid crystal display device or the like can be attained, and if the mask sputtering method is used, the protection layer can be easily formed with a precision slightly lower than that of the photolithography method and a manufacturing method suitable for a relatively rough pattern of a solar battery or the like can be attained.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

There will now be described first to fifth embodiments of this invention with reference to the accompanying drawings.

In the electrode plate for display device according to this invention, the silver-based layer included in a multi-layered conductive film forms a preferable reflection electrode when the film thickness of the silver-based layer is set to approx. 100 to 200 nm or more and forms a preferable transparent electrode when the film thickness of the silver-based layer is set in a range of approx. 7 to 25 nm.

FIRST EMBODIMENT

Figure 1:
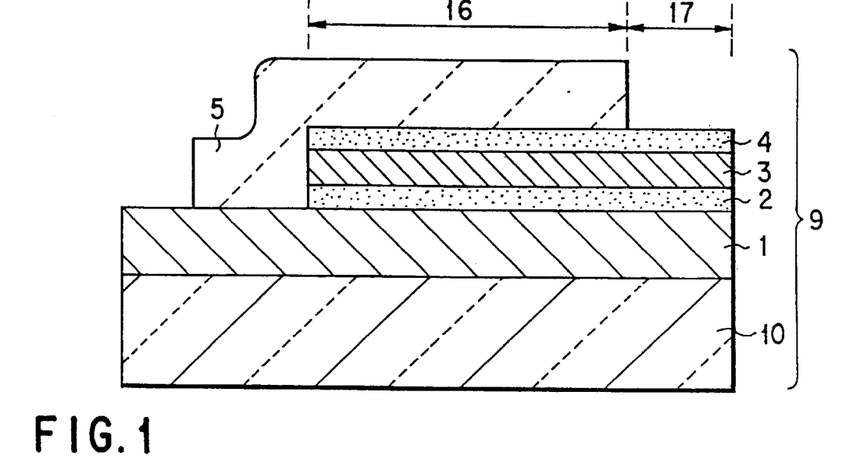
FIG. 1 is a view showing the schematic structure of an electrode plate according to a first embodiment of this invention.

FIG. 1 is a view showing the schematic structure of an electrode plate according to a first embodiment of this invention.

In FIG. 1, the main portion of an electrode plate 9 according to the first embodiment is constructed by a glass substrate 10 (made by Corning Co. 1737 material) with a thickness of 0.7 mm and an underlaid layer 1 with a thickness of 29 nm, a lower side amorphous oxide layer 2 with a thickness of 10 nm (as will be seen later, the lower side amorphous oxide function as a lower side anchoring layer), a silver-based layer 3 with a thickness of 15 nm, an upper side amorphous oxide layer 4 with a thickness of 10 nm (as will be seen later, the upper side amorphous oxide function as an upper side anchoring layer) and a protection layer 5 with a thickness of 29 nm which are sequentially laminated on the glass substrate 10. The lower side amorphous oxide layer 2, thin silver-based layer 3, and upper side amorphous oxide layer 4 form a multi-layered conductive film.

In the above configuration, if the glass substrate 10 is a soda glass substrate, the underlaid layer 1 has a function of an alkali barrier effect. Further, if an adherence between a substrate and an oxide layer is weak, the underlaid layer 1 has also a function of adherence layer for adhering between the substrate and the oxide.

The electrode plate 9 according to the first embodiment is a light transmission type electrode plate since the film thickness of the silver-based layer 3 is 15 nm (which lies in a range of approx. 7 to 25 nm).

The electrode plate 9 according to the first embodiment is formed by the following manufacturing process.

That is, first, the glass plate 10 which has been cleaned is inserted into a vacuum chamber (sputtering chamber) and a vacuum is drawn.

Next, the underlaid layer 1 is laminated and formed on the glass plate 10 by the sputtering method.

Then, the glass plate 10 is taken out from the vacuum chamber (sputtering chamber) and is heated at 300° C. for one hour to be subjected an anneal process. The glass plate 10 is again inserted into the vacuum chamber (sputtering chamber) and a vacuum is drawn. The lower side amorphous oxide layer 2, silver-based layer 3, and upper side amorphous oxide layer 4 are sequentially laminated and formed on the underlaid layer 1 by the sputtering method.

Then, the resultant glass plate 10 is taken out from the vacuum chamber (sputtering chamber) and a resist pattern (not shown) having a predetermined pattern (for example, stripe pattern) is formed on the upper side oxide layer 4 by the photolithography process. Next, sulfuric acid-series etchant containing nitric acid and iron nitrate by 1 weight % is used as an etching solution to simultaneously remove portions of the three layers of the lower side amorphous oxide layer 2, the silver-based layer 3 and the upper side amorphous oxide layer 4 which lie in an exposed portion from the resist pattern by etching.

Next, after a resist pattern portion corresponding to a display plane 16 shown in FIG. 1 is exposed again (at this time, a terminal portion 17 is not exposed), the resist pattern portion in the portion of the display plane 16 is removed by use of an organic alkali solution.

Next, the protection layer 5 is formed on the entire surface of the glass substrate 10 by use of the sputtering chamber.

Then, after the substrate is exposed again, the resist pattern lying on the terminal portion 17 is removed by use of the organic alkali solution, and then, the anneal process (heat treatment) for heating the substrate at the temperature of 200° C. for one hour is effected to obtain the electrode plate 9 of the first embodiment.

In the above manufacturing process, the underlaid layer 1 and protection layer 5 are each formed by use of a sputtering target formed of a mixed oxide material containing tin oxide, cerium oxide and gallium oxide. The composition of the sputtering target included tin 80 at % (atomic percentage), cerium 10 at % (atomic percentage) and gallium 10 at % (atomic percentage) in terms of the atomic percentage of metal elements (an oxygen element is not counted).

Next, the lower side amorphous oxide layer 2 and upper side oxide layer 4 are each formed by use of a sputtering target formed of a mixed oxide material containing indium oxide, cerium oxide, tin oxide and titanium oxide and the composition of the sputtering target included indium 88 at %, cerium 8.5 at %, tin 3 at % and titanium 0.5 at % in terms of the atomic percentage of metal elements (an oxygen element is not counted).

Further, the composition of an alloy target used for forming the silver-series thin film 3 included silver 98.5 at %, gold 1 at % and copper 0.5 at %.

The inventors of this invention formed films to a film thickness of 100 nm by use of the same materials as the protection layer 5 (or the underlaid layer 1) and the lower side amorphous oxide layer 2 (or the upper side amorphous oxide layer 4) and measured the refractive indexes of the films. As the result, it was understood that the refractive index of the former film was 2.06 and the refractive index of the latter film was 2.10 at the wavelength of 550 nm.

The sum of the optical film thickness (the product of the film thickness and the refractive index) of the protection layer 5 (or the underlaid layer 1) with a film thickness of 29 nm and the optical film thickness of the upper side oxide layer 4 (or the lower side amorphous oxide layer 2) was (29×2.06+10×2.17)=(59.74+21.0)=80.74 nm.

Under the above optical characteristics, it was confirmed that the transmissivity of the electrode plate 9 at the wavelength of 550 nm was set to 96% (the transmissivity of the single layer of the glass substrate 10 was used as a reference) on the display surface portion 16 on which the protection layer 5 was formed and thus a relatively large transmissivity was obtained.

Therefore, if each of the protection layer 5, lower side amorphous oxide layer 2 and upper side amorphous oxide layer 4 is formed with the above-described materials, the composition of the above materials and the film thicknesses, the refractive index and optical film thicknesses described above can be attained and the electrode plate with large transmissivity can be obtained.

Further, since the lower side amorphous oxide layer 2 and upper side amorphous oxide layer 4 for holding the silver-based layer 3 therebetween are both formed of amorphous, occurrence of aggregation and slight opaqueness caused by the movement of silver at the interface with the silver-based layer and a lowering in the transmissivity due to the aggregation and slight opaqueness can be suppressed.

The reason that each of the upper side amorphous oxide layer and the lower side amorphous oxide layer has above function is the following.

An atom of silver is easy to move on the surface with the silver-based layer. If the silver-based layer under exposing in air is heated at the temperature lied in range of approx. 200 to 300° C., the atoms of the silver diffuses and moves to the interface with the silver-based layer. The resulting atoms of the silver re-crystallize, grow and finally become clods of the silver. The clods of the silver causes aggregate and opaque at the interface with the silver-based layer and the reflectance of the silver-based layer is lowered. Note that if the interface with the silver-based layer (the respective surfaces of minute silver crystals before re-crystallization) is planted so-called cores of some molecular of oxide by sputtering method and the like, the cores act as anchors for suppressing the movement of the atoms of silver, prevent the atoms of silver from diffusing to the interface with the silver-based layer, suppress re-crystallization of the atoms of silver at the interface with the silver-based layer and prevent optical characteristic of the silver-based layer from deteriorating.

Rows of the cores of the oxide planted at the interface with the silver-based layer are the upper side amorphous oxide layer and the lower side amorphous oxide layer. That is, the upper side amorphous oxide layer and the lower side amorphous oxide layer can be called "anchoring layer" for fixing the movement of the silver at the interface with the silver-based layer like "anchor".

Therefore, the lower side amorphous oxide layer functions as a lower side anchoring layer and the upper side amorphous oxide layer functions as an upper side anchoring layer.

Note that viewing of the reliance, it is preferable that electrochemical characteristic (for example, potential of corrode) between the anchoring layer and the silver-based layer is close and the anchoring layer is amorphous or amorphous-like to suppress the diffusing of the silver at the interface with the silver-based layer. Further, it is necessary that the adherence between the anchoring layer and the silver-based layer is strong.

Further, it is preferable that the upper/lower side amorphous oxide layer is transparent materials of high resistance to alkali and at least the upper side amorphous oxide layer is soluble in etchant which is acid and the like used by etching.

Note that if the electrode plate of present invention applied for a display device used in a liquid crystal display device is used an electrode plate for driving liquid crystal, it is preferable that the anchoring layer is made of mixed oxide having basic conductive oxide materials.

Further, as shown in FIG. 1, a multi-layered film including the lower side amorphous oxide layer 2, the silver-based layer 3 and the upper side amorphous oxide layer 4 has three layered structure including the silver-based layer held between the lower side amorphous oxide layer 2 as the anchoring layer and the upper side amorphous oxide layer 4 as the anchoring layer. However, as will seen later in the third embodiment, from the viewing of optical characteristic, it is possible that the lower side amorphous oxide layer 2 or the upper side amorphous oxide layer 4 is a multi-layered film including transparent oxide film laid on an anchoring layer. Further, it is possible to select the above configurations of the multi-layered conductive film depending on an application of the film.

Further, since the lower side amorphous oxide layer 2 and upper side amorphous oxide layer 4 for holding the silver-based layer 3 therebetween are both formed of amorphous, occurrence of aggregation and slight opaqueness caused by the movement of silver at the interface with the silver-based layer and a lowering in the reflectance due to the aggregation and slight opaqueness can be suppressed.

Further, in the terminal portion 17, it is possible to make electrical connection with a low electrical resistance to the silver-based layer 3 via the upper side amorphous oxide layer 4 with a thin film thickness. The protection layer 5 on the display surface potion 16 can be used as a good insulating protection layer (the protection layer 5 is used as a film for preventing the electrical short circuit with respect to the facing substrate in a liquid crystal display device such as an STN) and the electrode plate with an electrically high reliability can be obtained.

In this case, the lower side amorphous oxide layer 2 and upper side amorphous oxide layer 4 for holding the silver-based layer 3 therebetween are both formed to a film thickness of 10 nm and it is considered that the critical value of the film thickness is not larger than 20 nm in order to attain the same effect. The result is derived by checking the degree to damage at the interface between the silver-based layer and the oxide layer caused by the photolithography process (the time of etching) from the viewpoint of a change in the connection resistance in the high temperature and the high humidity and determining the film thickness.

That is, a variation in the connection resistance was observed by variously changing the film thickness under the general condition (it was left for 1000 hours in an atmosphere of temperature 70° C. and humidity 95%) set in the endurance test. As the result, it is found that the stability of the connection resistance could be obtained when the film thicknesses of the upper side amorphous oxide layer 4 and the lower side amorphous oxide layer 2 are set to 20 nm or less, and more preferably, 10 nm or less.

Further, the total sum of the optical film thickness of the protection layer 5 (or the underlaid layer 1) and the optical film thickness of the upper side oxide layer 4 (or the lower side amorphous oxide layer 2) with a film thickness of 10 nm was set to 80.74 nm, but the same effect can be attained if the total sum is set to 70 nm or more. The reason is as follows.

When the film thicknesses of the upper side amorphous oxide layer 4 and the lower side amorphous oxide layer 2 holding the silver-based layer therebetween are set to 20 nm or less, the reflected light component from the silver-based layer becomes stronger and the sufficiently large transmissivity cannot be attained. For example, in the three-layered conductive film having the silver-based layer held between oxide layers with the refractive index of approx. 2, it is difficult to attain a large transmissivity unless the film thicknesses of the upper side amorphous oxide layer 4 and the lower side amorphous oxide layer 2 are set to approx. 40 to 45 nm.

SECOND EMBODIMENT

Figure 2:
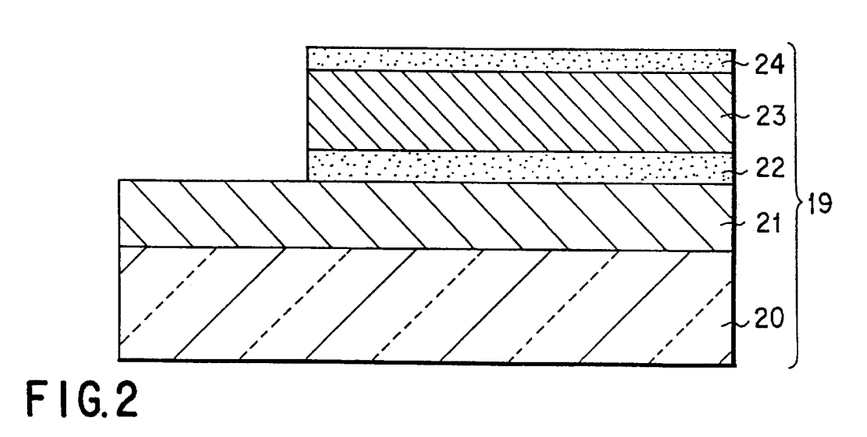
FIG. 2 is a view showing the schematic structure of an electrode plate according to a second embodiment of this invention.

FIG. 2 is a view showing the schematic structure of an electrode plate according to a second embodiment of this invention.

In FIG. 2, the main portion of an electrode plate 19 is formed by forming an underlaid layer 21 formed of $SiO_2$ with a film thickness of 40 nm on a glass substrate 20 (made by NIHON ITAGARASU KABUSHIKI KAISHA, H coat product) with a film thickness of 0.7 mm and then sequentially laminating a lower side amorphous oxide layer 22 (a lower side anchoring layer) with a film thickness of 20 nm, a silver-based layer 23 with a film thickness of 150 nm, and an upper side amorphous oxide layer 24 (an upper side anchoring layer) with a film thickness of 7 nm. The lower side amorphous oxide layer 22, thin silver-series thin film 23, and upper side amorphous oxide layer 24 form a multi-layered conductive film.

The electrode plate 19 according to the second embodiment is a reflective type electrode plate since the film thickness of the silver-based layer 23 is 150 nm (approx. 100 to 200 nm).

The electrode plate 19 according to the second embodiment is formed by the following manufacturing process.

First, the glass plate 20 which is cleaned is inserted into a vacuum chamber (sputtering chamber) and a vacuum is drawn.

Next, the underlaid layer 21 is laminated by the sputtering method. Next, the grass substrate 20 is taken out from the vacuum chamber (sputtering chamber), the anneal process (heat treatment) for heating the grass substrate 20 at the temperature of 300° C. for one hour is effected. Next, the grass substrate is inserted into a vacuum chamber (sputtering chamber) and a vacuum is drawn. Next, lower side amorphous oxide layer 22, silver-based layer 23 and upper side amorphous oxide layer 24 are continuously laminated by the sputtering method.

Then, the glass plate 20 is taken out from the vacuum chamber and a resist pattern having a preset pattern is formed on the upper side amorphous oxide layer 24 by the photolithography process. Next, sulfuric acid-series etchant containing nitric acid and iron nitrate by 1 weight % is used as an etching solution to simultaneously remove portions of the three layers of the lower side amorphous oxide layer 22, silver-based layer 23 and upper side oxide layer 24 which lie in an exposed portion from the resist pattern by etching.

Next, after the entire surface of the resist pattern is exposed again, the resist pattern is removed by use of an organic alkali solution. After this, the anneal process (heat treatment) for heating the substrate at the temperature of 200° C. for one hour is effected to obtain the electrode plate 19 of the second embodiment.

In the above manufacturing process, the underlaid layer 21 is formed by use of a sputtering target formed of silicon oxide ($SiO_2$) and has a function as the alkali barrier layer. Further, the lower side amorphous oxide layer has a function of an adhesive layer between underlaid layer 21 and the silver-based layer 23.

The composition of the target used for formation of the lower side amorphous oxide layer 22 and upper side oxide layer 24 includes indium oxide 77 at %, cerium oxide 20 at % and zinc oxide 3 at % in terms of the atomic percentage of metal elements (an oxygen element is not counted). Further, the composition of the alloy target used for forming the silver-based layer 23 includes silver 98.5 at %, gold 1 at % and copper 0.5 at %.

The inventors of this invention measured the refractive index of the upper side amorphous oxide layer 24 by use of the same material and composition and found that the refractive index was 1.447 at the wavelength of 550 nm and was 1.488 at the wavelength of 430 nm. The upper side amorphous oxide layer 24 was formed thin with a film thickness of 7 nm (no laminated layer of oxide is formed thereon) and the refractive index thereof is smaller than that of the bulk.

The reflectance of a multi-layered conductive film formed of the silver-based layer 23 and the upper side amorphous oxide layer 24 was measured by use of the integrating sphere with barium sulfate used as a reference and the result showed that the refractive index was 96% at the wavelength of 550 nm and 88% at the wavelength of 430 nm and was thus large. Further, the optical film thickness of the upper side amorphous oxide layer 24 with the film thickness of 7 nm and the refractive index of 1.447 (wavelength 550 nm) was 7×1.447=10.129 nm.

Depending on the materials of the silver-based layer and the amorphous oxide layers and the surface condition of the ground layer (for example, substrate or the like), the oxide is not formed in the uniform film form but formed in the island form when the film thickness of the upper side amorphous oxide layer 24 is set in the range of 2 to 10 nm, and the film includes voids and the refractive index of the film is smaller than that of the bulk from the optical viewpoint. As a result, the reflectance and an optical characteristic are heightened.

Further, the optical film thickness (the product of the film thickness and the refractive index) of the upper side amorphous oxide layer 24 was 10.129 nm, but it is considered that the critical value of the film thickness is not larger than 20 nm in order to attain the same effect. The result is derived by comparing the reflectance of the reflective type electrode plate using the silver-based layer with the reflectance of the reflective type electrode plate using the aluminum thin film from the viewpoint of optical characteristics and making a determination based on the comparison result.

That is, the reflectance of silver is larger than that of aluminum by approx. 10% and may be a good metal, but the reflectance thereof on the short wavelength side tends to become smaller depending on the additive amount of an alloy element to silver or the film thickness of the upper side amorphous oxide layer 24 or the lower side amorphous oxide layer 22.

For example, the reflectance of aluminum for light of 430 nm (the wavelength of the blue range) is approx. 85%.

Therefore, in order to provide an electrode plate more excellent than the conventional case, it is necessary to attain the reflectance of approx. 85% or more at the wavelength of 430 nm in the electrode plate of this invention using the silver-based layer. The inventors of this invention derived from various studies that the reflectance of approx. 85% or more could be obtained at the wavelength of 430 nm if the optical film thickness of the oxide layer was 20 nm or less in terms of the value of the optical film thickness which is the product of the film thickness (the unit is nm) and the refractive index.

However, as described before, in the thin film region, the refractive index of the oxide layer is smaller than that of the bulk.

The upper side amorphous oxide layer 24 and the lower side amorphous oxide layer 22 have a function as an anchor fixing the movement of silver at the interface with the silver-based layer, but when the film thickness is considered for the function from the viewpoint of high temperature heat resistance, the function can be fully attained even if the film thickness is approx. 1 nm.

If the above film thickness is set, the advantage that the etching time is reduced and damage to the interface caused by the etching can be reduced by the reduction in the etching time can be attained, but it is preferable to set the lower limit of the film thickness to 2 nm or more since the film is somewhat unstable from the viewpoint of the manufacturing process when a variation in the film thickness at the time of formation of the film and wash-away at the time of cleaning using an alkali solution or the like are taken into consideration.

In order to check the durability of the optical characteristics of the electrode plate 19 with the above-described materials, the composition of the materials and the thickness and the electrode plate 9 according to the first embodiment, the electrode plates were stored for 1000 hours in a high-temperature and high-humidity chamber in which the temperature was set at 70° C. and the humidity was set at 95% and variations in the optical characteristics were checked. As the result, it was found that variations in the optical characteristics (transmissivity or reflectance) and the adhesive properties of the electrode patterns were not observed and the reliability (durability) was extremely preferable.

Therefore, according to the electrode plates 9 and 19, a highly endurable electrode can be realized.

Further, in order to check the heat resistance of the electrode plate 19 with the above-described materials, the composition of the materials and the thickness and the electrode plate 9 according to the first embodiment, the electrode plates 9 and 19 were heated for one hour at the temperature of 250° C. or heated for one hour at the temperature of 300° C. and the heat resistance of each of the electrode plates 9 and 19 was checked. As the result, it was found that a variation in the heat resistance was not observed as in the durability and the electrode plates had the excellent heat resistance.

Therefore, according to the electrode plates 9 and 19, a highly endurable electrode can be realized.

Further, in order to check the resistance to alkali of the electrode plate 19 with the above-described materials, the composition of the materials and the thickness and the electrode plate 9 according to the first embodiment, the electrode plates 9 and 19 were dipped in an alkali solution (containing NaOH by 1 weight %) at the temperature of 40° C. for 10 minutes and the resistance to alkali was checked, but no variation was observed and it was proved that the electrode plate 9 according to the first embodiment and the electrode plate 19 had the sufficiently high resistance to alkali in practice.

Therefore, according to the electrode plates 9 and 19, an electrode which has the high resistance to alkali can be realized.

Further, since the lower side amorphous oxide layer 22 and upper side oxide layer 24 for holding the silver-based layer 23 therebetween are both formed of amorphous, occurrence of aggregation and slight opaqueness caused by the movement of silver at the interface with the silver-based layer and a lowering in the reflectance of the silver-based layer 23 due to the aggregation and slight opaqueness can be suppressed.

Further, the each connection resistance of the electrode plate 19 according to the second embodiment and the electrode plate 9 according to the first embodiment was measure by taking the electrical mounting on the liquid crystal display device such as STN (the evaluation was made by applying a needle of berylium-copper alloy) and it was found that the connection resistance was approx. 0.5 to 1Ω and the connection resistance was lower than that of the transparent electrode (ITO) which was normally used.

Therefore, according to the electrode plate 19 and the electrode 9 with the above-described materials, the composition of the materials and the thickness, the electrodes which are also excellent in the connection resistance can be obtained.

THIRD EMBODIMENT

Figure 3:
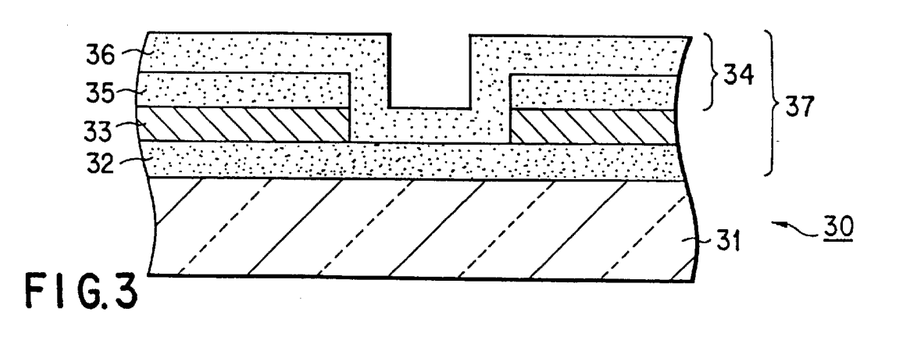
FIG. 3 is a view showing the schematic structure of an electrode plate according to a third embodiment of this invention.

As shown in FIG. 3, an electrode plate 30 according to a third embodiment of this invention has a laminated film 37 formed on a glass substrate 31 having an $SiO_2$ (silicon oxide) layer coated on the surface thereof and having an alkali barrier function. The laminated film 37 is formed of a lower side amorphous oxide layer 32, silver-based layer 33 and upper side oxide layer 34 and the upper side oxide layer 34 is a multi-layered layer having a first amorphous oxide layer 35 (anchoring layer) and a second amorphous oxide layer 36 laminated on the first amorphous oxide layer 35. The film thickness of the lower side amorphous oxide layer 32 is set to 25 nm, the film thickness of the silver-based layer 33 is set to 15 nm, the film thickness of the amorphous oxide layer 35 is set to 10 nm, and the film thickness of the second amorphous oxide layer 36 is set to 30 nm. The lower side amorphous oxide layer 32, silver-based layer 33, and upper side oxide layer 34 form a multi-layered conductive film.

The electronic plate 30 according to the third embodiment is a light transmission type electronic plate since the thin film of the silver-based layer 33 is 15 nm.

In this case, the lower side amorphous oxide layer 32 is formed of a mixed oxide material which contained cerium oxide as a main material and additionally contained niobium oxide by 15 at % in terms of the at % (atomic percentage) only of the metal atom which did not include the oxygen atom. The amorphous oxide layer 35 is formed of a mixed oxide material containing indium oxide, cerium oxide, tin oxide and titanium oxide and the composition thereof contained indium oxide 88 at % (atomic percentage), cerium oxide 8.5 at % (atomic percentage), tin oxide 3.0 at % (atomic percentage) and titanium oxide 0.5 at % 8 (atomic percentage) in terms of the at % (atomic percentage), only of the metal atom which did not include the oxygen atom. The second amorphous oxide layer 36 is formed of a mixed oxide material which contained cerium oxide as a main material and additionally contained niobium oxide by 15 at % in terms of the at % (atomic percentage) only of the metal atom which do not include the oxygen atom. The silver-based layer 33 is formed of a silver alloy having gold and copper added to silver and the composition thereof contained silver 98.5 at % (atomic percentage), gold 1.0 at % (atomic percentage) and copper 0.5 at % (atomic percentage).

The electrode plate 30 according to the third embodiment is formed by the following manufacturing process.

First, the soda glass substrate 31 is subjected to the degreasing, cleaning and drying process and then put into the sputtering chamber, and a voltage is applied to a mixed oxide (cerium oxide and niobium oxide) target having the above-described composition to form a lower side amorphous oxide layer 32 on the soda glass substrate 31 by RF (high frequency) sputtering.

The atmosphere set in the sputtering chamber is the same as that set at the time of formation of the lower side oxide thin film in the forth embodiment described later (that is, the gas pressure of the mixed gas of Ar and $O_2$ was set at 0.35 Pa and the percentage of $O_2$ was set at 10%).

When the step of forming the lower side amorphous oxide layer 32 is completed, discharging and introduction of gas are stopped and a vacuum is drawn to the vacuum degree $5 \times 10^{-4}$ Pa in the sputtering chamber.

Next, Ar gas is introduced into the sputtering chamber to adjust the gas pressure to 0.4 Pa and a voltage is applied to a silver alloy (silver, gold, copper) target with the above composition to form a silver-based layer 33 by DC (direct current) sputtering.

When the step of forming the silver-based layer 33 is completed, discharging and introduction of gas are stopped and a vacuum are drawn to the vacuum degree $5 \times 10^{-4}$ Pa in the sputtering chamber.

Next, a voltage is applied to a mixed oxide (indium oxide and cerium oxide) target with the above composition to form an amorphous oxide layer 35 on the silver-based layer 33 by DC (direct current) sputtering. At this time, the atmosphere set in the sputtering chamber is the same as that set at the time of formation of the upper side amorphous oxide thin film 44 in the forth embodiment (that is, the mixed gas pressure of Ar and $O_2$ is set at 0.35 Pa and the percentage of $O_2$ was set at 0.75%).

Next, the soda glass substrate 31 is taken out from the sputtering chamber and a photolithography process from the step of coating the photosensitive resin (positive resist) to the step of separating the photosensitive resin pattern is effected for the soda glass substrate 31 in the same manner as in the forth embodiment to form the silver-based layer 33 and amorphous oxide layer 35 in a preset electrode pattern.

At the time of etching, the lower side amorphous oxide layer 32 is not etched and remain in the same film form as it was formed.

Next, the soda glass substrate 31 is put into the sputtering chamber again and the sputtering chamber is evacuated, and then a voltage is applied to a mixed oxide (cerium oxide and niobium oxide) target having the above-described composition to form a second amorphous oxide layer 36 on the substrate 31 by RF (high frequency) sputtering. The RF sputtering is carried out by mask sputtering the second amorphous oxide layer 36 is formed in a predetermined area except the terminal portion of the electrode pattern. Further, the atmosphere set in the sputtering chamber is the same as that set at the time of formation of the lower side oxide thin film 42 in the forth embodiment (that is, the mixed gas pressure of Ar and $O_2$ is set at 0.35 Pa and the percentage of $O_2$ was set at 10%).

Next, the substrate on which the second amorphous oxide layer 36 is formed is subjected to the drying process at 180° C. for one hour to obtain the electrode plate 30 as shown in FIG. 3.

During the film formation by sputtering, the substrate is not heated and film formation is continuously effected with the vacuum condition kept.

In order to check the electrical stability of the electrode plate 30 having the thin films with the above-described materials, the composition of the materials and the thicknesses, the electrical short circuit between the electrode patterns was checked by use of a wiring tester, but the electrical short circuit between the electrode patterns by the lower side amorphous oxide layer 32 which was not etched and remained was not observed.

Therefore, with the above structure, the electrode plate with high electrical stability can be realized.

Further, the transmissivity of the electrode plate 30 obtained in the third embodiment was 70% or more at the wavelength (400 to 700 nm) of the visible region and was sufficiently large and the area resistance was a low resistance of 2.7 Ω/□.

Therefore, according to the lower side amorphous oxide layer 32 and upper side oxide layer 34 with the above-described materials, composition and thickness, the electrode plate with the large transmissivity and low resistance can be realized.

Further, since the lower side amorphous oxide layer 32 and the amorphous oxide layer 35 which hold the silver-based layer 33 therebetween are both formed of amorphous, occurrence of aggregation and slight opaqueness caused by the movement of silver at the interface with the silver-based layer and a lowering in the transmissivity of the silver-based layer 33 due to the aggregation and slight opaqueness can be suppressed.

Further, the amorphous oxide layer 36 according to the third embodiment is an amorphous material. However, since the amorphous oxide layer 36 functions as heightening a transmission by adjustment of the refractive index and a protection layer of the silver-based layer 33, the amorphous oxide layer 36 is not necessarily limited to be amorphous.

The laminated film 37 obtained in the third embodiment is formed as a transparent electrode, which makes the laminated film 37 to be suppressed the side etching at the time of etching to minimum.

FOURTH EMBODIMENT

Figure 4:
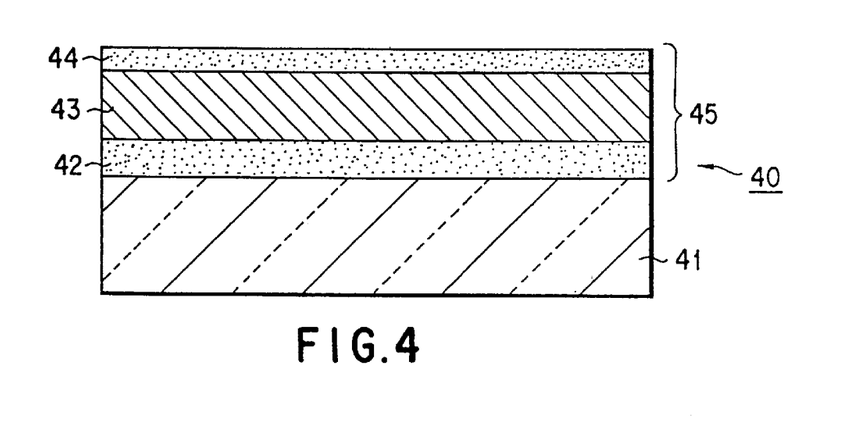
FIG. 4 is a view showing the schematic structure of an electrode plate according to fourth and fifth embodiments of this invention.

As shown in FIG. 4, an electrode plate 40 according to the fourth embodiment of this invention has a laminated film 45 which has a lower side amorphous oxide layer 42, silver-based layer 43 and upper side oxide layer 44 sequentially laminated by sputtering on a soda glass substrate 41 having an $SiO_2$ (silicon oxide) layer coated on the surface thereof and having an alkali barrier function and which is formed into a preset pattern.

In the fourth embodiment, the film thickness of the lower side amorphous oxide layer 42 is set to 50 nm, the film thickness of the silver-based layer 43 is set to 150 nm, and the film thickness of the upper side amorphous oxide layer 44 is set to 8.5 nm.

Therefore, the electrode plate 40 of the fourth embodiment is a reflective type.

In this case, the lower side amorphous oxide layer 42 is formed of a mixed material which contained cerium oxide as a main material and additionally contained niobium oxide by 15 at % in terms of the at % (atomic percentage) only of the metal atom which does not include the oxygen atom. The upper side amorphous oxide layer 44 is formed of a mixed oxide material containing indium oxide and cerium oxide and the composition thereof contained indium oxide 66.7 at % (atomic percentage) and cerium oxide 33.3 at % (atomic percentage) in terms of the at % (atomic percentage) only of the metal atom which does not include the oxygen atom. The silver-based layer 43 is formed of a silver alloy having gold and copper added to silver and the composition of the silver alloy contained silver 98.5 at % (atomic percentage), gold 1.0 at % (atomic percentage) and copper 0.5 at % (atomic percentage).

The electrode plate 40 according to the fourth embodiment is formed by the following manufacturing process. That is, the soda glass substrate 41 is subjected to the degreasing, cleaning and drying process and then put into the sputtering chamber, and the sputtering chamber is evacuated.

When a vacuum is drawn to the vacuum degree $5 \times 10^{-4}$ Pa in the sputtering chamber, Ar (argon) gas and $O_2$ (oxygen) gas are introduced into the sputtering chamber to adjust the gas pressure in the sputtering chamber to 0.35 Pa. At this time, $O_2$ (oxygen) gas in the introduced gas is adjusted to 10% (for example, at the rate of 10 SCCM of the introduced $O_2$ gas with respect to introduced Ar gas of 100 SCCM) in terms of the percentage of $O_2$ gas in the introduced gas.

Next, after the above gas is introduced into the sputtering chamber, a voltage is applied to a mixed oxide (cerium oxide and niobium oxide) target with the above composition to form a lower side amorphous oxide layer 42 on the substrate 41 by RF (high frequency) sputtering.

When the step of forming the lower side amorphous oxide layer 42 is completed, discharging and introduction of gas are stopped and a vacuum is drawn to adjust the gas pressure to the vacuum degree $5 \times 10^{-4}$ Pa in the sputtering chamber.

Next, Ar gas is introduced into the sputtering chamber to adjust the gas pressure to 0.4 Pa and a voltage is applied to a silver alloy (silver, gold, copper) target with the above composition to form a silver-based layer 43 by DC (direct current) sputtering.

When the step of forming the silver-based layer 43 is completed, discharging and introduction of gas are stopped and a vacuum is drawn to adjust the gas pressure to the vacuum degree $5 \times 10^{-4}$ Pa in the sputtering chamber.

Next, Ar (argon) gas and $O_2$ (oxygen) gas are introduced into the sputtering chamber to adjust the gas pressure in the sputtering chamber to 0.35 Pa. At this time, the amount of $O_2$ (oxygen) gas in the introduced gas is adjusted to 0.75% (for example, at the rate of 0.75 SCCM of the introduced $O_2$ gas with respect to introduced Ar gas of 100 SCCM) in terms of the percentage of $O_2$ gas in the introduced gas.

Next, after the above gas is introduced into the sputtering chamber, a voltage was applied to a mixed oxide (indium oxide and cerium oxide) target with the above composition to form an upper side amorphous oxide layer 44 by DC (direct current) sputtering and thus a three-layered laminated film 45 is formed.

During the film formation, the substrate 41 is not heated and film formation is continuously effected with the vacuum condition kept.

According to the above-described materials, composition and thicknesses, the light reflectance of the laminated film 45 is 88% or more at the wavelength (400 to 700 nm) of the visible region and is sufficiently large. Further, the area resistance of the laminated film 45 is 0.28 Ω/□ and the electrode plate of low resistance can be realized.

Next, the manufacturing method for subjecting the laminated film 45 obtained in the above manufacturing process to the following photolithography process to form a preset pattern is explained.

First, photosensitive resin (positive resist) is coated to a film thickness 1 μm on the laminated film obtained in the above manufacturing process by use of a spinner and then a dry process is effected at 90° C. for 20 minutes in an oven.

Next, after patterning exposure is effected on the photosensitive resin by use of an exposure device using an exposure photomask having a preset pattern, the development is effected by use of an alkali developing solution (potassium hydroxide 10 weight %). As a result, a portion of the photosensitive resin subjected to the patterning exposure is dissolved and removed and a photosensitive resin pattern is formed in a preset reflection film portion.

After the development, a dry process is effected again at 90° C. for 20 minutes in the oven.

Next, an etching solution containing a mixture of sulfuric acid, nitric acid and acetic acid is used for etching the laminated film and the etching process is effected by dipping the laminated film in the etching solution at the liquid temperature 40° C. for approx. 30 seconds (that is, the portion of the laminated film exposed from the photosensitive resin pattern was dissolved and removed by etching). At the time of etching, the lower side amorphous oxide layer 42 is not etched out and remained in the same film form as it was formed.

After light is applied to the whole portion of the substrate after etching, the photosensitive resin pattern is separated by use of an alkali separating solution (potassium hydroxide 1 weight %).

Next, the substrate is subjected to the drying process at 180° C. for one hour to obtain the electrode plate 45 (reflection electrode) of a preset pattern.

The side etching to the laminated film 45 obtained in the photolithography process is suppressed to minimum at the time of etching and a gap (a distance between the adjacent electrodes) between the electrode patterns formed by etching could be set to such a small value as approx. 6 μm.

According to the above manufacturing method, the width of the electrode pattern can be enlarged by an amount by which the amount of the side etching can be reduced and light can be effectively reflected.

Further, the electrode plate 40 obtained in the fourth embodiment is tested by use of the wiring tester to check the electrical short circuit between the electrode patterns, but the electrical short circuit between the electrode patterns by the lower side amorphous oxide layer 42 which is not etched and remained is not observed and the electrode plate 40 with high electrical stability can be realized.

Further, since the lower side amorphous oxide layer 42 and upper side oxide layer 44 for holding the silver-based layer 43 therebetween are both formed of amorphous, occurrence of aggregation and slight opaqueness caused by the movement of silver at the interface with the silver-based layer, and a lowering in the reflectance of the silver-based layer 43 due to the aggregation and slight opaqueness can be suppressed.

FIFTH EMBODIMENT

Like the fourth embodiment, an electrode plate 40 according to the fifth embodiment of this invention has a laminated film 45 which has a lower side amorphous oxide layer 42, silver-based layer 43 and upper side amorphous oxide layer 44 sequentially laminated by sputtering on a soda glass substrate 41 having an $SiO_2$ (silicon oxide) layer coated on the surface thereof and which is formed into a preset pattern.

The schematic view of the electrode plate of the fifth embodiment is the same as that of FIG. 4, but the thicknesses of the layers are different and the film thickness of the lower side amorphous oxide layer 42 was set to 50 nm, the film thickness of the silver-based layer 43 is set to 150 nm and the film thickness of the upper side amorphous oxide layer 44 is set to 3.5 nm.

Also, the electrode plate 40 of the fifth embodiment is a reflective type.

The lower side amorphous oxide layer 42 is formed of a mixed oxide material which contains cerium oxide as a main material and additionally contained niobium oxide by 15 at % in terms of the at % (atomic percentage) only of the metal atom which does not include the oxygen atom. The upper side oxide layer 44 is formed of a mixed oxide material containing indium oxide, cerium oxide, tin oxide and titanium oxide and the composition thereof contains indium oxide 88 at % (atomic percentage), cerium oxide 8.5 at % (atomic percentage),tin oxide 3.0 at % (atomic percentage) and titanium oxide 0.5 at % in terms of the at % (atomic percentage) only of the metal atom which does not include the oxygen atom. Further, the silver-based layer 43 is formed of a silver alloy having gold and copper added to silver and the composition of the silver alloy contained silver 98.5 at % (atomic percentage), gold 1.0 at % (atomic percentage) and copper 0.5 at % (atomic percentage).

The electrode plate 40 according to the fifth embodiment is formed by the following manufacturing process. That is, the soda glass substrate 41 is subjected to the degreasing, cleaning and drying process and then put into the sputtering chamber.

The internal portion of the sputtering chamber used in the fifth embodiment is divided into three continuous chambers. In order to prevent contaminations occurring during the film formation from giving an influence on the process in the adjacent chamber, the chambers are arranged with a preset space from one another and a shielding and exhaust measure is taken. After the soda glass substrate 41 is put into the sputtering chamber, a vacuum is drawn in the sputtering chamber, and Ar gas is introduced when the vacuum degree reached $5\times10^{-4}$ Pa and the gas pressure in the sputtering chamber is adjusted to 0.4 Pa.

The soda glass substrate 41 put into the sputtering chamber is carried by a carriage tray (not shown) and moved at a constant speed in each chamber of the sputtering chamber. At this time, the lower side amorphous oxide layer 42, silver-based layer 43 and upper side amorphous oxide layer 44 are sequentially formed in the respective chambers.

When the substrate 41 passes through the first chamber of the sputtering chamber, a voltage is applied to a mixed oxide (cerium oxide and niobium oxide) target having the above-described composition to form a lower side amorphous oxide layer 42 by RF (high frequency) sputtering. Likewise, when the substrate 41 passes through the second chamber, a voltage is applied to a silver alloy (silver, gold and copper) target with the above composition to form a silver-based layer 43 by DC (direct current) sputtering. Next, when the substrate 41 passes through the third chamber, a voltage is applied to a mixed oxide (indium oxide and cerium oxide) target having the above-described composition to form an upper side amorphous oxide layer 44 by DC (direct current) sputtering. At the time of formation of the oxide layer, $O_2$ gas is introduced into the first and third chambers in addition to Ar gas and the rate of $O_2$ gas introduced into the first chamber is 7% (the rate of 7 SCCM of introduced $O_2$ gas with respect to introduced Ar gas of 100 SCCM) and the rate of $O_2$ gas introduced into the third chamber is 0.75% (the rate of 0.75 SCCM of introduced $O_2$ gas with respect to introduced Ar gas of 100 SCCM).

During formation of the film on the substrate 41, the glass substrate 41 is not heated and the substrate 41 is subjected to the baking process at 180° C. for one hour after the laminated film is formed.

The three-layered laminated film 45 obtained in the fifth embodiment is formed as a reflection film, the light reflectance thereof is 90% or more and sufficiently large at the wavelength (400 to 700 nm) of the visible region, and the area resistance is as low as 0.27 $\Omega/\square$.

Therefore, according to the electrode plate 40 having the thin films with the above-described materials, the composition of the materials and the thicknesses, the electrode plate with the large reflectance and low resistance can be realized.

Further, since the lower side amorphous oxide layer 42 and the upper side amorphous oxide layer 44 which hold the silver-based layer 43 therebetween are both formed of amorphous, occurrence of aggregation and slight opaqueness caused by the movement of silver at the interface with the silver-based layer and a lowering in the reflectance of the silver-based layer 43 due to the aggregation and slight opaqueness can be suppressed.

Further, since the lower side amorphous oxide according to the third, forth, fifth embodiment is insulation, patterning to the lower side amorphous oxide is needless, which makes easy to form patterns.

Therefore, according to the electrode plate with the above materials, the composition of the materials and the thickness, a transparent electrode plate with the large transmissivity or the reflectance and low resistance can be realized.

Further, in this invention, since the insulated film can be laminated being adjusted to attain an optical characteristic, the conventional process for forming a insulated film called overcoat is needless, which can make the manufacturing process to be simple.

As described above, this invention has been explained with reference to the embodiments, but this invention is not limited to the above embodiments and, for example, this invention can be variously modified without departing from the technical scope thereof as follows.

(1) The lower side amorphous oxide layers in the third, fourth, fifth and sixth embodiments were each formed of a mixed oxide material which contained cerium oxide as a main material and additionally contained niobium oxide by 15% in terms of the at % (atomic percentage) only of the metal atom which did not include the oxygen atom. Oxide added to cerium oxide is not limited to niobium, but oxides of metals in the groups 3A, 4A, 5A of the periodic table may be used. Particularly, it is preferable to add one or more types of oxides selected from a group of ytrium oxide, zirconium oxide, niobium oxide, hafnium oxide, tantalum oxide and tungsten oxide.

The lower side amorphous oxide layer with the above configurations has good adherence for the silver-based layer and alkali barrier effect. Further, the lower side amorphous oxide layer is enough stable not to be etched by etching solution used in photolithography process and at the time of patterning, and remains in the same film form as it was formed. As a result, if there is no under-laid layer between a substrate and multi-layered conductive film, migration of alkali metal to the silver-based layer is prevented. Further, if the lower side amorphous oxide layer remains in the film form, the lower side amorphous oxide layer does not cause the electrical short circuit to the electrode patterns due to having no conductivity.

With the above configuration, the same effect can be attained.

(2) When the electrode plate according to this invention is used for a liquid crystal or the like, the materials of the upper side amorphous oxide layer 4, upper side amorphous oxide layer 24, upper side amorphous oxide layer 44, amorphous oxide layer 35, lower side amorphous oxide layer 2 and lower side amorphous oxide layer 22 may be changed to the following material from the viewpoint of the refractive index and conductivity.

That is, if it is desired to obtain oxide of the small refractive index, for example, $SiO_2$, MgO, $Al_2O_3$, $GeO_2$, $Bi_2O_3$ may be used and if it is desired to obtain oxide of the large refractive index, for example, $TiO_2$, $CeO_2$, $ZrO_2$, $HfO_2$, $Nb_2O_5$, $Ta_2O_5$ may be used. Further, as the conductive oxide material, $In_2O_3$, $SnO_2$, ZnO may be used, for example.

Therefore, an oxide material other than the above oxide materials or a mixed oxide material selectively and mixedly containing two or more types of the above oxide materials or the like in which the number of oxygen elements added thereto is adjusted may be used to form the amorphous oxide layer, upper side amorphous oxide layer or lower side amorphous oxide layer.

If a mixed oxide material having $In_2O_3$ or ZnO used as the substrate material is used, the etching process can be easily effected.

Further, the precision of the configuration of the electrode pattern formed on the electrode plate and the reliability of the electrode according to this invention can be further enhanced by adding a small amount of oxide material such as ZnO or MgO which is easily dissolved into acid to the above mixed oxide material so as to set the oxidation-reduction potential of the mixed oxide material closer to that of the silver-based layer.

Further, a layer with the large refractive index may be inserted into the central portion in the thickness direction of the silver-based layer used for the electrode plate according to this invention from the viewpoint of the refractive index. In the case of a transmission type conductive film, a conductive film with the smaller reflectance can be obtained by inserting a layer with the large refractive index between the silver-based layers. At this time, the transmissivity may be improved in some cases.

(3) In all of the above embodiments, the transparent substrate was used as the substrate used for the electrode plate for display device according to this invention. However, the substrate is not necessary transparent and may be a substrate which is colored in white, black or other color according to the application of the display device.

The substrate itself may be a substrate on which an electric circuit is formed, a silicon wafer substrate on which a solar battery is formed, or a heat-resistant organic film or a substrate on which semiconductor elements of amorphous silicon, polysilicon or MIM (diode elements) are formed.

Further, it is possible to directly or indirectly form a polarization element, diffraction grating, hologram, light scattering film, λ/4 wavelength plate, phase difference film, micro-lens, color filter or the like on the substrate.

(4) The protection layer in the above embodiments is formed of oxide which is highly resistant to chemical and has a high insulating property from the viewpoint of reliability (durability). However, nitride, organic resin, fluororesin, Teflon resin, silicon resin or the like may be used other than the above oxide material, or a coating film having a transparent pigment mixed in the above materials may be used. Further, a reflection preventing film or water repellent layer can be formed on the protection layer from the viewpoint of reliability (durability).

In a case where the electrode plate of this invention is used for solar battery (in this case, a semiconductor element of amorphous silicon, for example, is formed on the substrate), the protection layer may be formed sufficiently thick to attain high reliability (high durability).

Further, the protection layer may be formed by use of the sol-gel method which is used for means for forming a layer which is generally called an "overcoat" on the liquid crystal substrate.

When the protection layer is required to have a large dielectric factor for driving the crystal such as TFT, ferroelectric crystal or antiferroelectric crystal, the protection layer may be formed of a material with large dielectric factor.

(5) The silver-based layer included in the electrode plate according to the first, second, third, forth and fifth embodiment forms a preferable reflection electrode when the film thickness the silver-based layer is set to approx. 100 to 200 nm or more and forms a preferable transparent electrode when the film thickness thereof is set in a range of approx. 7 to 25 nm. However, the film thickness thereof is not limited in the above ranges. If the silver-based layer forms a semi-reflection electrode or semi-transparent electrode when the film thickness thereof is set to approx. 5 to 100 nm. The each of the transparent component and the reflection component has the same effect of the present invention.

Note that, generally speaking, the electrode plate is a preferable reflective electrode plate when the reflectance of the electrode plate is more than 70% and is a preferable transparent electrode when the transmissivity of the electrode plate is more than 88% at the wavelength (400 to 700 nm) of the visible region.

As described above, according to this invention, an electrode plate having a transmission type or reflective type conductive film and having an excellent optical characteristic (transmissivity, reflectance), low electrical connection resistance, good patterning configuration, and high stability can be realized.

What is claimed is:

1. An electrode plate for display device comprising:
    a substrate; and
    a multi-layered conductive film, wherein said multi-layered conductive film includes a silver-based layer, a lower side amorphous oxide layer formed of an amorphous or amorphous-like material for suppressing movements of silver atoms at an interface with said silver-based layer, and an upper side amorphous oxide layer formed of an amorphous or amorphous-like material for suppressing movements of silver atoms at an interface with said silver-based layer and at least a film thickness of said upper side amorphous oxide layer is not larger than 20 nm.

2. The electrode plate for display device according to claim 1, wherein said upper side amorphous oxide layer comprises an oxide layer of which optical film thickness defined as a product of a film thickness and a refractive index is not larger than 20 nm.

3. The electrode plate for display device according to claim 1, which further comprises a protection layer formed on said upper side amorphous oxide layer and in which a sum of the optical film thicknesses of said upper side amorphous oxide layer and said protection layer is not less than 70 nm.

4. The electrode plate for display device according to claim 1, further comprising a protection layer formed on said upper side amorphous oxide layer, said protection layer being an oxide layer having a refractive index not larger than that of said upper side amorphous oxide layer.

5. The electrode plate for display device according to claim 1, wherein said lower side amorphous oxide layer has an underlaid layer formed of an oxide layer having a refractive index not larger than that of the lower side amorphous oxide layer.

6. The electrode plate for display device according to claim 1, wherein said lower side amorphous oxide layer is formed of a mixed oxide material which contains cerium oxide as a main material and additionally contains at least one oxide material selected from a group of ytrium oxide, zirconium oxide, niobium oxide, hafnium oxide, tantalum oxide and tungsten oxide.

7. The electrode plate for display device according to claim 6, wherein at least niobium oxide is selected to be added to the cerium oxide which is the main material of said lower side oxide layer.

8. The electrode plate for display device according to claim 6, wherein said lower side amorphous oxide layer formed of an amorphous or amorphous-like material is formed of a mixed oxide which contains at least niobium oxide mixed with cerium oxide.

9. An electrode plate for display device comprising:
   a substrate; and
   a multi-layered conductive film; wherein said multi-layered conductive film includes a lower side amorphous oxide layer formed of an amorphous or amorphous-like material for suppressing a movement of silver atom at an interface with said silver-based layer, a silver-based layer, and an upper side oxide layer and said upper side oxide layer includes an oxide layer and an amorphous oxide layer formed of an amorphous or amorphous-like material for suppressing a movements of silver atoms at an interface with said silver-based layer and a film thickness of said upper side amorphous oxide layer is not larger than 20 nm.

10. The electrode plate for display device according to claim 9, wherein an optical film thickness defined as a product of the film thickness and a refractive index of said amorphous oxide layer included in said upper side oxide layer is not larger than 20 nm.

11. The electrode plate for display device according to claim 9, which further comprises a protection layer formed on said upper side oxide layer and in which a sum of the optical film thicknesses of said upper side oxide layer and said protection layer is not less than 70 nm.

12. The electrode plate for display device according to claim 9, further comprising a protection layer formed on said upper side oxide layer, said protection layer being an oxide layer having a refractive index not larger than that of said amorphous oxide layer included in said upper side oxide layer.

13. The electrode plate for display device according to claim 9, wherein said lower side amorphous oxide layer has an underlaid layer formed of an oxide material having a refractive index not larger than that of the lower side amorphous oxide layer.

14. The electrode plate for display device according to claim 9, wherein said lower side amorphous oxide layer is formed of a mixed oxide material which contains cerium oxide as a main material and additionally contains at least one oxide material selected from a group of ytrium oxide, zirconium oxide, niobium oxide, hafnium oxide, tantalum oxide and tungsten oxide.

15. The electrode plate for display device according to claim 14, wherein at least niobium oxide is selected to be added to the cerium oxide which is the main material of said lower side amorphous oxide layer.

16. The electrode plate for display device according to claim 14, wherein said lower side amorphous oxide layer formed of an amorphous or amorphous-like materials is formed of a mixed oxide which contains at least niobium oxide mixed with cerium oxide.

17. The electrode plate for display device according to any one of claims 1, 6, 9 and 14, wherein said silver-based layer is a silver alloy containing at least one metal selected from a group of platinum, palladium, gold, copper and nickel added to silver by not larger than 3 at % (atomic percentage).

* * * * *

UNITED STATES PATENT AND TRADEMARK OFFICE
CERTIFICATE OF CORRECTION

PATENT NO. : 6,249,082 B1
DATED : June 19, 2001
INVENTOR(S) : Kenzo Fukuyoshi et al.

It is certified that error appears in the above-identified patent and that said Letters Patent is hereby corrected as shown below:

Column 20,
Line 32, change "forth" to -- fourth --.

Column 22,
Line 26, change "forth" to -- fourth --.

Signed and Sealed this

Fifteenth Day of January, 2002

Attest:

JAMES E. ROGAN
Attesting Officer       Director of the United States Patent and Trademark Office